United States Patent
Otosaka

(10) Patent No.: US 9,683,689 B2
(45) Date of Patent: Jun. 20, 2017

(54) FLANGE FIXING STRUCTURE

(71) Applicant: SHIN-ETSU CHEMICAL CO., LTD., Tokyo (JP)

(72) Inventor: Tetsuya Otosaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/711,134

(22) Filed: May 13, 2015

(65) Prior Publication Data

US 2015/0362107 A1 Dec. 17, 2015

(30) Foreign Application Priority Data

Jun. 16, 2014 (JP) .................................. 2014-123621

(51) Int. Cl.
| | | |
|---|---|---|
| F16L 23/00 | (2006.01) | |
| F16L 23/22 | (2006.01) | |
| F16L 23/036 | (2006.01) | |
| F16L 23/028 | (2006.01) | |
| F16L 23/032 | (2006.01) | |
| F16L 23/24 | (2006.01) | |
| F16L 49/04 | (2006.01) | |

(52) U.S. Cl.
CPC ............ *F16L 23/22* (2013.01); *F16L 23/003* (2013.01); *F16L 23/0283* (2013.01); *F16L 23/032* (2013.01); *F16L 23/036* (2013.01); *F16L 23/24* (2013.01); *F16L 49/04* (2013.01)

(58) Field of Classification Search
CPC ..... F16L 23/003; F16L 23/0283; F16L 49/04; F16L 23/24; F16L 23/032

USPC .................................................. 285/364, 368
See application file for complete search history.

(56) References Cited

U.S. PATENT DOCUMENTS

| | | | | |
|---|---|---|---|---|
| 674,928 | A * | 5/1901 | Mauran ................. | F16L 23/032 285/368 |
| 3,332,710 | A * | 7/1967 | Doty ...................... | F16L 49/04 285/336 |
| 6,328,247 | B1 * | 12/2001 | Fechter .............. | B65H 54/2881 242/473.5 |

FOREIGN PATENT DOCUMENTS

| | | |
|---|---|---|
| JP | 2010133493 A | 6/2010 |
| JP | 2013234734 A | 11/2013 |

* cited by examiner

*Primary Examiner* — Gregory Binda
(74) *Attorney, Agent, or Firm* — Oliff PLC

(57) ABSTRACT

A flange fixing structure is provided that fixes flange parts respectively provided to two pipe conduits by means of a fixture in a butting manner via a gasket. In this flange fixing structure, when an effective length of the fixture is denoted by $L_0$, a linear expansion coefficient of the fixture is denoted by $\alpha_0$, thicknesses of n (where n is an integer of 1 or more) members held by the fixture are respectively denoted by $t_1$ to $t_n$, and linear expansion coefficients of the n members are respectively denoted by $\alpha_1$ to $\alpha_n$, a product $L_0\alpha_0$ of the effective length $L_0$ of the fixture and the linear expansion coefficient $\alpha_0$ of the fixture is substantially equal to a sum $\Sigma t_i \alpha_i$ (i=1 to n) of products of the respective thicknesses $t_1$ to $t_n$ and the respective linear expansion coefficients $\alpha_1$ to $\alpha_n$.

10 Claims, 5 Drawing Sheets

FLANGE FIXING STRUCTURE

CROSS-REFERENCE TO RELATED APPLICATION

This non-provisional application claims priority under 35 U.S.C. §119(a) from Japanese Patent Application No. 2014-123621, filed on Jun. 16, 2014, the entire contents of which are incorporated herein by reference.

BACKGROUND

Technical Field

The present invention relates to a flange fixing structure, and in particular to a flange fixing structure which is suitable for fixing and sealing a flange part when the temperature variation is significant.

Background Art

As a method of connecting a plurality of pipe conduits in a serial manner, there is a method in which a flange part is provided at an end part of a pipe conduit and flange parts of two pipe conduits are fixed with each other in a butting manner via a gasket. Such method of fixing flange parts is defined in many standards, including Japan Industrial Standards (JIS)-B2220, and is widely and generally used (see, for example, JP2013-234734 A and JP2010-133493 A).

In order to prevent the leakage of a fluid passing through pipe conduits, it is necessary to apply an appropriate surface pressure to the gasket so as to fix the flange parts. In such case, even when an appropriate surface pressure is applied at the time of assembly, if deficiency in surface pressure occurs during use, a leakage of fluid will occur.

Causes of surface pressure deficiency include the expansion of flange fixtures due to temperature variation, plastic deformation of such flange fixtures and gaskets, or the like. In particular, it is difficult to keep the fluid sealed in by means of flanges for a long period of time at locations where the temperature variation is significant.

SUMMARY OF THE INVENTION

As a method of producing quartz glass, a method is known in which a porous glass base material is produced by depositing fine glass particles onto a glass rod through flame hydrolysis of a glass raw material, such as silicon tetrachloride or the like, and such porous glass base material is transparent-vitrified through heating. In particular, this method is widely used for the production of preforms for quartz optical fibers. In this method, in order to achieve transparent-vitrification, it is known to place the porous glass base material in a furnace core tube made of quartz glass and to heat it up to approximately 1500° C. with a carbon heater or the like from outside of such furnace core tube.

In this method, a chlorine gas atmosphere is used in order to remove impurities in glass prior to or during the vitrification process. Since chlorine gas is highly poisonous, the quartz furnace core tube needs to be gas-sealed in a precise manner. In doing so, since high-temperature quartz glass moves within the furnace core tube, a problem exists to the effect that sealing performance is likely to be deteriorated when quartz pipes configuring the quartz furnace core tube are connected by means of flanges. When the sealing performance is deteriorated, the atmosphere inflows into the furnace core tube and this constitutes a cause leading to the degradation of product features.

Accordingly, a furnace core tube has been used, which is integrally formed, except for sections thereof where the temperature load is small, so that no connection part is provided at sections thereof where the temperature variation is significant. However, there is a restriction in the length to which the furnace core tube can be produced in an integral manner. For this reason, the length of the quartz glass rod to be produced under this restriction is also subject to restriction, and thus, it is extremely difficult to produce a large-scale quartz glass rod. Accordingly, in order to produce a larger-scale quartz glass rod, it is necessary to develop a flange part sealing mechanism with a good sealing property even when the temperature variation is significant and to use a plurality of furnace core tubes by connecting the same with respect to each other with such flange part sealing mechanism.

An object of the present invention is to provide a flange fixing structure in which a good sealing property is obtained even when the temperature variation is significant.

In order to achieve such object, the present invention provides a flange fixing structure for fixing flange parts respectively provided to two pipe conduits by means of a fixture in a butting manner via a gasket. In this flange fixing structure, when an effective length of the fixture is denoted by $L_0$, a linear expansion coefficient of the fixture is denoted by $\alpha_0$, thicknesses of n (where n is an integer of 1 or more) members held by the fixture are respectively denoted by $t_1$ to $t_n$, and linear expansion coefficients of the n members are respectively denoted by $\alpha_1$ to $\alpha_n$, a product $L_0\alpha_0$ of the effective length $L_0$ of the fixture and the linear expansion coefficient $\alpha_0$ of the fixture is made substantially equal to a sum $\Sigma t_i \alpha_i$ (i=1 to n) of products of the respective thicknesses $t_1$ to $t_0$ and the respective linear expansion coefficients $\alpha_1$ to $\alpha_n$. According to such configuration, an amount of expansion of the fixture of the flange parts and an amount of expansion of the members held by the fixture become substantially equal to one another, and generation of deficient and/or excessive surface pressure of the gasket is suppressed.

In addition, in the flange fixing structure according to the present invention, wherein, when a thickness of the gasket sandwiched between the flange parts of the respective two pipe conduits is denoted by t, an amount of variation in thickness between prior to and after fixing by sandwiching the gasket is denoted by $\Delta t$, and recovery of the gasket is denoted by r, $\Delta T (L_0\alpha_0 - \Sigma t_i\alpha_i) < r(t - \Delta t)$ may be satisfied when a temperature is varied by $\Delta T$ after the flange parts are fixed by means of the fixture. In this way, when $\Delta T (L_0\alpha_0 - \Sigma t_i\alpha_i) < r(t - \Delta t)$ is satisfied, there is no longer such a situation where the clamping surface pressure becomes zero at the time of heating.

Further, in the flange fixing structure according to the present invention, when a thickness of the gasket sandwiched between the flange parts of the respective two pipe conduits is denoted by t, an amount of variation in thickness between prior to and after fixing by sandwiching the gasket is denoted by $\Delta t$, and recovery of the gasket is denoted by r, $\Delta T (L_0\alpha_0 - \Sigma t_i\alpha_i) < 0.1 \ r (t - \Delta t)$ may be satisfied when a temperature is varied by $\Delta T$ after the flange parts are fixed by means of the fixture. In this way, when $\Delta T (L_0\alpha_0 - \Sigma t_i\alpha_i) < 0.1 \ r(t - \Delta t)$ is satisfied, a variation in the amount of compression of the gasket due to the heat history can be kept sufficiently small and thus, a good sealing property can be maintained for a long period of time.

Moreover, in the flange fixing structure according to the present invention, a buffering member may be arranged between the flange part and the fixture. According to such configuration, even when the flange part or the fixture is made of a brittle material, the chance of breakage at the time of clamping flanges or heat loading is reduced.

Additionally, in the flange fixing structure according to the present invention, when the flange parts are fixed by means of the fixture, an amount of compression of the buffering member may be smaller than an amount of compression of the gasket. According to such configuration, a variation in surface pressure over time of the gasket can be made small and thus, a good sealing property can be maintained for a long period of time.

Further, in the flange fixing structure according to the present invention, the gasket may be made of an expansion graphite sheet. No wear damage or the like due to oxidization occurs in the expansion graphite sheet up to a temperature of approximately 400° C. in the atmosphere. Therefore, according to such configuration, a good sealing property can be maintained against a number of chemical substances without any deterioration.

Moreover, in the flange fixing structure according to the present invention, a structure may be provided that keeps a periphery of the gasket in an inert gas atmosphere. When an expansion graphite sheet is used as the gasket, a good sealing property can be maintained even at temperatures higher than 400° C. (for example, 1,000° C.), without any deterioration, by keeping the periphery thereof in an inert gas atmosphere.

Additionally, in the flange fixing structure according to the present invention, a material of the buffering member may be a ceramic fiber sheet. As described above, when the buffering member is arranged between the flange part and the fixture, a good sealing property can be maintained even in a high-temperature oxidization atmosphere by using a ceramic fiber sheet as the material of the buffering member.

In addition, in the flange fixing structure according to the present invention, a material of the buffering member may be an expansion graphite sheet. A good sealing property can be maintained by using an expansion graphite sheet as the material of the buffering member. Due to its properties, the expansion graphite sheet has more definite data on heat expansion than that of the ceramic fiber sheet, such that designing in which the amount of expansion can be more precisely controlled can be carried out by making use of such data.

Further, in the flange fixing structure according to the present invention, a structure may be provided that keeps surroundings of the buffering member in an inert gas atmosphere. When an expansion graphite sheet is used as the buffering member, a good sealing property can be maintained even at temperatures higher than 400° C. (for example, 1,000° C.), without any deterioration, by keeping the surroundings of the buffering member in an inert gas atmosphere.

DETAILED DESCRIPTION OF THE EMBODIMENTS

Figure 1:
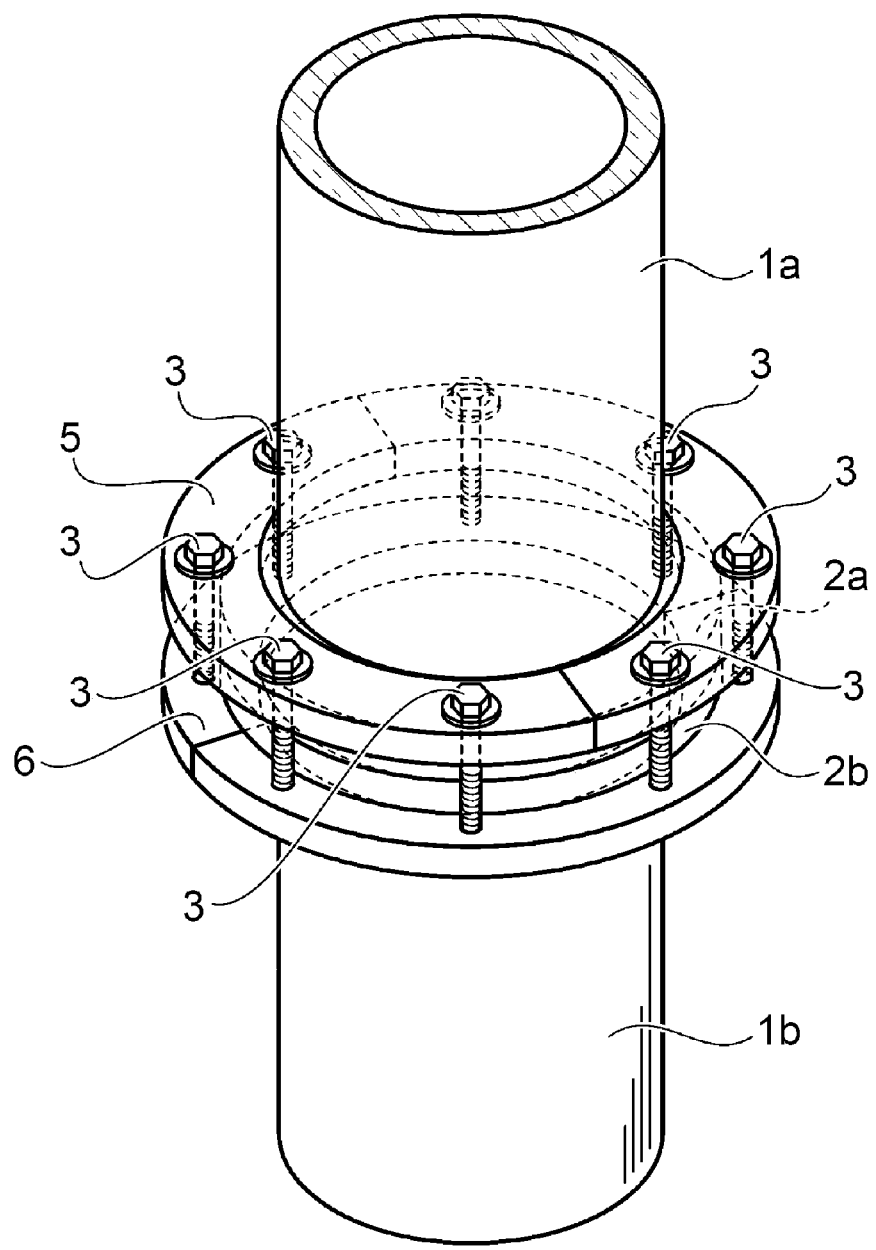
FIG. 1 is a schematic perspective view illustrating a flange fixing structure according to a first embodiment.

Hereinafter, embodiments of the present invention will be described based on the drawings. It should be noted that, in the following description, the same members are denoted by the same reference numerals, and the description of the members already made heretofore will be omitted when necessary.

First Embodiment

FIG. 1 is a schematic perspective view illustrating a flange fixing structure according to a first embodiment.

As shown in FIG. 1, the flange fixing structure according to the present invention is a structure for connecting two pipe conduits 1a and 1b by means of the respective flange parts 2a and 2b. A flange part 2a is provided at an end part of the pipe conduit 1a, and a flange part 2b is provided at an end part of the pipe conduit 1b. The flange parts 2a and 2b are sandwiched and fixed between a first flange pressing member 5 and a second flange pressing member 6, which are respectively provided on the upper side and the lower side of the flange parts.

Each of the first flange pressing member 5 and the second flange pressing member 6 is configured by a ring-shaped flat plate member. The ring-shaped flat plate member may be divided into, for example, two sections. As shown in FIG. 1, the dividing position in the first flange pressing member 5 and the dividing position in the second flange pressing member 6 may be made different in the circumferential direction of the flanges. It should be noted that each of the first flange pressing member 5 and the second flange pressing member 6 may be a small-piece-shaped flat plate member. In the present embodiment, an example in which the flange pressing members are ring-shaped flat plate members will be described.

Figure 2:
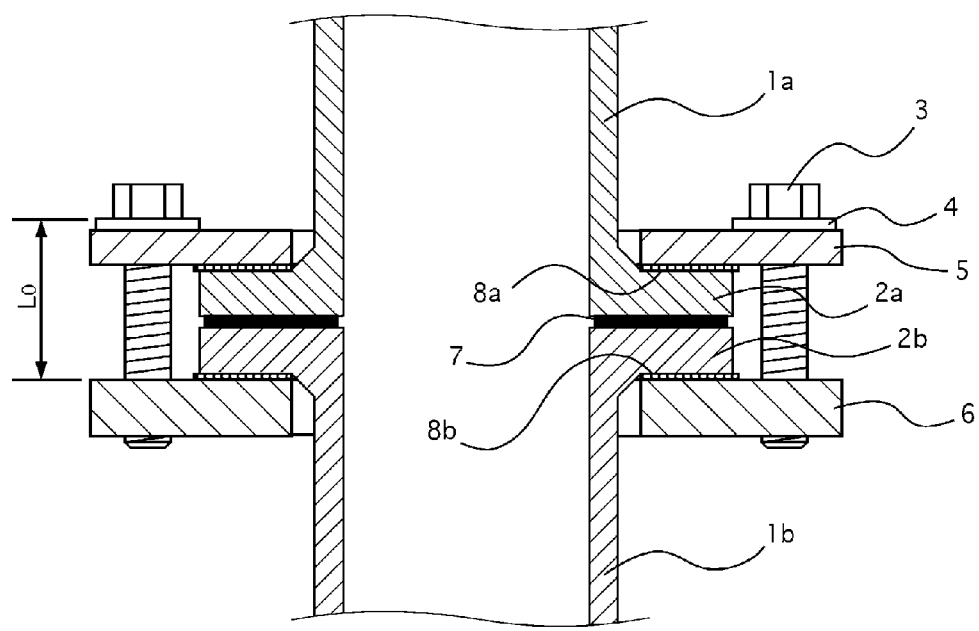
FIG. 2 is a schematic cross-sectional view illustrating a flange fixing structure according to a first embodiment.

FIG. 2 is a schematic cross-sectional view illustrating a flange fixing structure according to a first embodiment.

As shown in FIG. 2, in order to connect two pipe conduits 1a and 1b, the respective flange parts 2a and 2b are made to butt against each other via a gasket 7 and are fixed in this condition by means of a fixture.

The flange parts 2a and 2b are fixed by means of a flange fixing bolt 3, a washer 4, the first flange pressing member 5, a buffer 8a, the second flange pressing member 6 and a buffer 8b. The first flange pressing member 5 and the second flange pressing member 6 are arranged so as to sandwich the butting flange parts 2a and 2b from outside. The flange parts 2a and 2b are press-fixed by sandwiching the flange parts 2a and 2b between the first flange pressing member 5 and the second flange pressing member 6 and fastening them by means of the flange fixing bolt 3.

A female screw, which is not shown, is provided in the second flange pressing member 6. Thus, the second flange pressing member 6 is coupled to the flange fixing bolt 3 by means of a screw. Accordingly, in the present embodiment, since a configuration is provided in which the other members are fixed by means of the lower surface of the flange fixing bolt 3 and the upper surface of the second flange pressing member 6, the gap between the lower surface of the flange fixing bolt 3 and the upper surface of the second flange pressing member 6 becomes an effective length $L_0$ of the fixture for fixing the flange parts 2a and 2b.

A hole is provided in the first flange pressing member 5 for passing the flange fixing bolt 3 therethrough. The buffer 8a may be arranged between the first flange pressing member 5 and the flange part 2a, if needed. In addition, the buffer 8b may be arranged between the second flange pressing member 6 and the flange part 2b, if needed.

The buffers 8a and 8b are arranged so as to prevent breakage of brittle members due to the fastening of the bolt, if any of the flange parts 2a, 2b, the first flange pressing member 5 and the second flange pressing member 6 is made of a brittle material.

Preferable materials for the buffers 8a and 8b include: non-woven fabric (ceramic fiber sheet) that makes use of ceramic fiber, such as alumina and silica; and material with high compression restorability and flexibility, such as expanded graphite sheets.

In addition, when the flange parts 2a and 2b are fixed by means of the flange fixing bolt 3, the amount of compression of the buffers 8a and 8b may be smaller than the amount of compression of the gasket 7. In this way, a variation in surface pressure over time of the gasket 7 can be made small and thus, a good sealing property can be maintained for a long period of time.

In FIG. 1, the flange fixing bolt 3 and the second flange pressing member 6 function as the fixture. In addition, members (fixed members) that are held by the fixture include seven members, i.e. the washer 4, the first flange pressing member 5, the buffer 8a, the flange part 2a, the gasket 7, the flange part 2b and the buffer 8b.

According to the present embodiment, a product $L_0\alpha_0$ of the effective length $L_0$ of the fixture and a linear expansion coefficient $\alpha_0$ thereof is substantially equal to the sum $\Sigma t_i \alpha_i$ (wherein i denotes a member number 1 to 7 of the fixed members) of products of the respective thicknesses $t_i$ of seven fixed members and the respective linear expansion coefficients $\alpha_i$ thereof. Here, the phrase "substantially equal" includes, in addition to the case where both exactly match one another, the case in which $\Sigma t_i \alpha_i$ is within ±15% with respect to $L_0\alpha_0$.

By making $L_0\alpha_0$ substantially equal to $\Sigma t_i \alpha_i$, an amount of elongation in the axial direction of the fixing members and an amount of thickness increase of the fixed members, when the temperature variation occurs, become substantially equal. Accordingly, substantially no variation occurs to the surface pressure applied to the gasket 7, and thus, regardless of the temperature variation, a good sealing condition can be maintained.

Here, in the flange fixing structure shown in FIG. 1, $L_0\alpha_0$ and $\Sigma t_i \alpha_i$ were calculated when the flange parts 2a and 2b were fixed, using materials and dimensions for the respective parts shown in Table 1 below. As a result, both $L_0\alpha_0$ and $\Sigma t_i \alpha_i$ assumed the value of $2.8\times10^{-4}$.

TABLE 1

| Flange fixture $L_0\alpha_0$ = 2.8E−04 | | | |
|---|---|---|---|
| Member | Material | Linear expansion coefficient $\alpha_0$ [K$^{-1}$] | Length $L_0$ [mm] |
| Flange fixing bolt | Alumina | 7.9E−06 | 35.6 |

| Fixed members $\Sigma t_i \alpha_i$ = 2.8E−04 | | | | |
|---|---|---|---|---|
| Number i | Member | Material | Linear expansion coefficient $\alpha_i$ [K$^{-1}$] | Thickness $t_i$ [mm] |
| 1 | Washer | Alumina | 7.9E−06 | 4 |
| 2 | Flange pressing member A | Alumina | 7.9E−06 | 10 |
| 3 | Buffer | Expansion graphite | 1.0E−04 | 0.4 |
| 4 | Flange | Quartz glass | 5.0E−07 | 10 |
| 5 | Gasket | Expansion graphite | 1.0E−04 | 0.8 |
| 6 | Flange | Quartz glass | 5.0E−07 | 10 |
| 7 | Buffer | Expansion graphite | 1.0E−04 | 0.4 |

Further, in the present embodiment, when an amount of variation in a thickness t5 of the gasket 7 between prior to and after fixing is denoted by Δt and the recovery of the gasket 7 is denoted by r, $\Delta T(L_0\alpha_0 - \Sigma t_i \alpha_i) < r(t-\Delta t)$ may be satisfied. In this way, the clamping surface pressure at the time of heating does not become zero, even when there is a difference between the expansion amount of the fixture and the expansion amount of the members held by the fixture.

Moreover, in the present embodiment, $\Delta T(L_0\alpha_0 - \Sigma t_i \alpha_i) < 0.1\, r(t-\Delta t)$ may be satisfied. In this way, a variation in the amount of compression of the gasket 7 due to the heat history can be kept sufficiently small and thus, a good sealing property cab be maintained for a long period of time.

Second Embodiment

Figure 3:
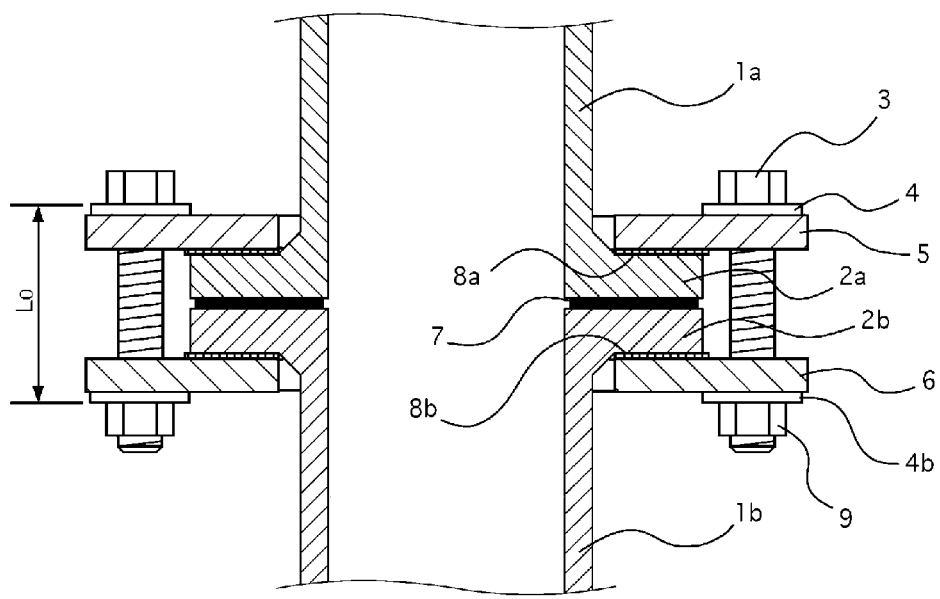
FIG. 3 is a schematic cross-sectional view illustrating a flange fixing structure according to a second embodiment.

FIG. 3 is a schematic cross-sectional view illustrating a flange fixing structure according to a second embodiment.

As shown in FIG. 3, unlike the first embodiment shown in FIG. 2, the second flange pressing member 6 of the flange fixing structure according to the second embodiment is not provided with a female screw. Instead, the flange fixing bolt 3 is fixed by means of a nut 9 provided on the outer side of the second flange pressing member 6.

In the flange fixing structure according to the second embodiment shown in FIG. 3, the flange fixing bolt 3 and the nut 9 function as the fixture. In addition, members (fixed members) that are held by the fixture include nine members, i.e. a washer 4a, the first flange pressing member 5, the buffer 8a, the flange part 2a, the gasket 7, the flange part 2b, the buffer 8b, the second flange pressing member 6 and a washer 4b.

Here, in the flange fixing structure shown in FIG. 3, $L_0\alpha_0$ and $\Sigma t_i \alpha_i$ were calculated when the flange parts 2a and 2b were fixed, using materials and dimensions for the respective parts shown in Table 2 below. As a result, both $L_0\alpha_0$ and $\Sigma t_i \alpha_i$ assumed the value of $3.9\times10^{-4}$.

TABLE 2

| Flange fixture $L_0\alpha_0$ = 3.9E−04 | | | |
|---|---|---|---|
| Member | Material | Linear expansion coefficient $\alpha_0$ [K$^{-1}$] | Length $L_0$ [mm] |
| Flange fixing bolt | Alumina | 7.9E−06 | 49.6 |

| Fixed members $\Sigma t_i \alpha_i$ = 3.9E−04 | | | | |
|---|---|---|---|---|
| Number i | Member | Material | Linear expansion coefficient $\alpha_i$ [K$^{-1}$] | Thickness $t_i$ [mm] |
| 1 | Washer | Alumina | 7.9E−06 | 4 |
| 2 | Flange pressing member A | Alumina | 7.9E−06 | 10 |

TABLE 2-continued

| | | | | |
|---|---|---|---|---|
| 3 | Buffer | Expansion graphite | 1.0E−04 | 0.4 |
| 4 | Flange | Quartz glass | 5.0E−07 | 10 |
| 5 | Gasket | Expansion graphite | 1.0E−04 | 0.8 |
| 6 | Flange | Quartz glass | 5.0E−07 | 10 |
| 7 | Buffer | Expansion graphite | 1.0E−04 | 0.4 |
| 8 | Flange pressing member B | Alumina | 7.9E−06 | 10 |
| 9 | Washer | Alumina | 7.9E−06 | 4 |

Third Embodiment

Figure 4:
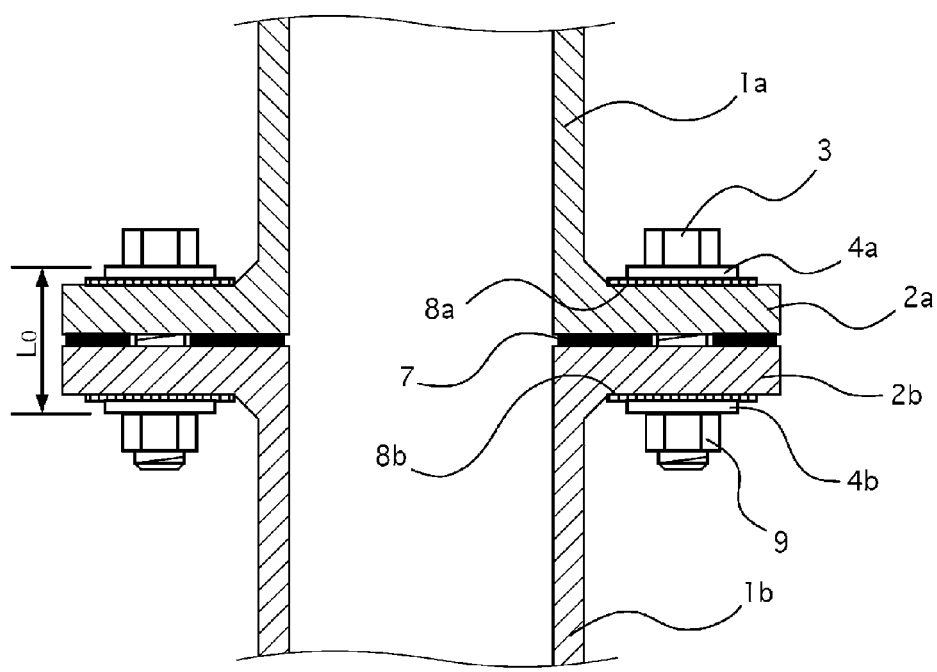
FIG. 4 is a schematic cross-sectional view illustrating a flange fixing structure according to a third embodiment.

FIG. 4 is a schematic cross-sectional view illustrating a flange fixing structure according to a third embodiment.

As shown in FIG. 4, unlike the first embodiment shown in FIG. 2, in the flange fixing structure according to the third embodiment, holes are provided in the flange parts 2a and 2b for passing the flange fixing bolt 3 therethrough, and the flange parts 2a and 2b are directly fixed by the flange fixing bolt 3 and the nut 9.

In the flange fixing structure according to the third embodiment shown in FIG. 4, the flange fixing bolt 3 and the nut 9 function as the fixture. In addition, members (fixed members) that are held by the fixture include seven members, i.e. the washer 4a, the buffer 8a, the flange part 2a, the gasket 7, the flange part 2b, the buffer 8b and the washer 4b.

Here, in the flange fixing structure shown in FIG. 4, $L_0 \alpha_0$ and $\Sigma t_i \alpha_i$ were calculated when the flange parts 2a and 2b were fixed, using materials and dimensions for the respective parts shown in Table 3 below. As a result, both $L_0 \alpha_0$ and $\Sigma t_i \alpha_i$ assumed the value of $2.8 \times 10^{-4}$.

TABLE 3

| Flange fixture $L_0 \alpha_0$ = 2.8E−04 | | | |
|---|---|---|---|
| Member | Material | Linear expansion coefficient $\alpha_0$ [K$^{-1}$] | Length $L_0$ [mm] |
| Flange fixing bolt | SUS430 | 1.1E−05 | 25.3 |

| Fixed members $\Sigma t_i \alpha_i$ = 2.8E−04 | | | | |
|---|---|---|---|---|
| Number i | Member | Material | Linear expansion coefficient $\alpha_i$ [K$^{-1}$] | Thickness $t_i$ [mm] |
| 1 | Washer | SUS304 | 7.9E−06 | 1.5 |
| 2 | Buffer | Expansion graphite | 1.0E−04 | 0.4 |
| 3 | Flange | Quartz glass | 5.0E−07 | 10 |
| 4 | Gasket | Expansion graphite | 1.0E−04 | 1.5 |
| 5 | Flange | Quartz glass | 5.0E−07 | 10 |
| 6 | Buffer | Expansion graphite | 1.0E−04 | 0.4 |
| 7 | Washer | SUS304 | 1.8E−05 | 1.5 |

Fourth Embodiment

Figure 5:
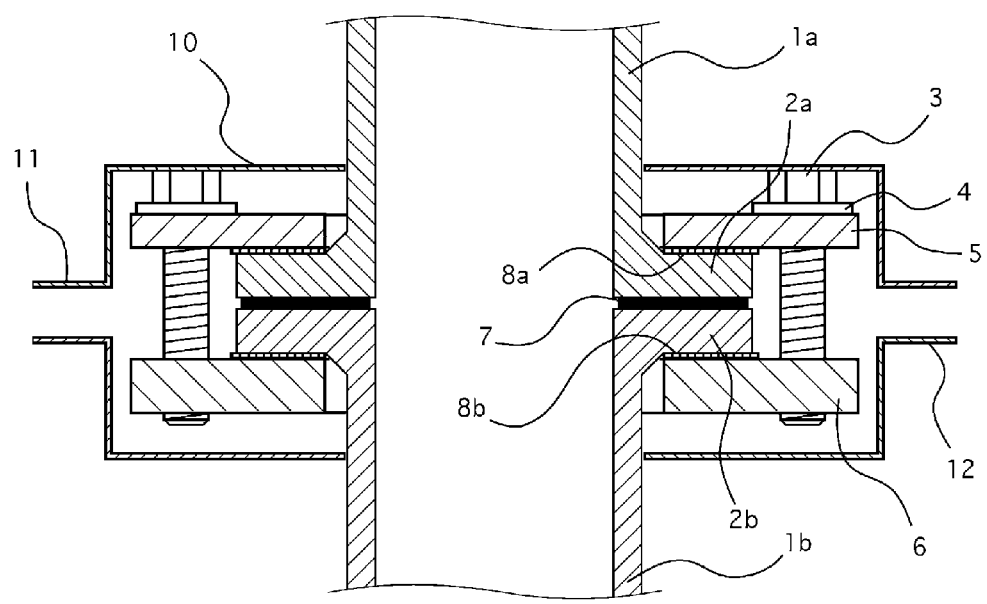
FIG. 5 is a schematic cross-sectional view illustrating a flange fixing structure according to a fourth embodiment.

FIG. 5 is a schematic cross-sectional view illustrating a flange fixing structure according to a fourth embodiment.

As shown in FIG. 5, the flange fixing structure according to the fourth embodiment is provided with a flange protection cover 10, in addition to the flange fixing structure according to the first embodiment shown in FIG. 2.

The flange protection cover 10 is provided with nozzles 11 and 12. Introduction and discharge of gas are performed through these nozzles 11 and 12.

In the case where an expansion graphite sheet is used for the gasket 7 and buffers 8a, 8b, when the temperature of the flange parts 2a and 2b exceeds 400° C., the expansion graphite sheet is oxidized from the outside by oxygen in the atmosphere, and this leads to degradation of the gas sealing property. Therefore, a configuration is employed in which inert gas, such as nitrogen, argon or the like, is introduced through the nozzle 11 and discharged from the nozzle 12. In this way, wear damage due to oxidization of the expansion graphite sheet is prevented and thus, a good gas sealing property can be maintained for a long period of time.

In addition, if a pump or an exhaust fan is used for discharge from the nozzle 12, the interior of the flange protection cover 10 can be kept at a pressure slightly reduced with respect to that of the exterior thereof. In this way, even if process gas (or liquid) in the pipe conduits 1a and 1b leaks from the connection parts of the flange parts 2a and 2b, the diffusion to the surrounding area can be prevented.

Next, examples and a comparative example will be described below.

First Example

In the first example, the respective parts of the flange fixing structure shown in FIG. 5 were configured with the materials shown in Table 1. The clamping surface pressure of the gasket 7 was set to be 7 MPa, which is the minimum clamping surface pressure in the specifications of the gasket 7. Chlorine gas was made to flow within the pipe conduits 1a and 1b at a rate of 1 L/min and nitrogen gas was made to flow through the nozzle 11 at a rate of 10 L/min. An exhaust fan was connected to the nozzle 12 and the exit of the exhaust fan was connected to detoxifying facilities. The internal pressure of the flange protection cover 10 was conditioned to be 100 Pa lower than the atmosphere pressure and the pressure inside the pipe conduits 1a and 1b was conditioned to be 1 kPa higher than the pressure inside the flange protection cover 10. Increase and decrease of the temperature between room temperature and 1,000° C. were repeated 10 times (the time for holding the temperature at 1,000° C. was 1 hour), and a chlorine gas leakage amount was evaluated by measuring the chlorine concentration in the nitrogen gas discharged from the nozzle 12. As a result, the chlorine concentration was always equal to or less than the lower detection limit (i.e. 0.01 ppm) and the chlorine gas leakage amount was equal to or less than 0.1 μL/min.

Second Example

In the second example, the respective parts of the flange fixing structure shown in FIG. 5 were configured with the materials shown in Table 1. The clamping surface pressure of the gasket 7 was set to be 3 MPa, which is lower than the minimum clamping surface pressure in the specifications of the gasket 7. Otherwise, the same conditions as those of the first example were applied. Similarly to the first example, a chlorine gas leakage amount was evaluated by measuring the chlorine concentration in the nitrogen gas discharged from the nozzle 12. As a result, the chlorine gas concentration varied between 3 to 10 ppm and the chlorine gas leakage amount was 30 to 100 μL/min. Although a small amount of leakage was observed, the leaked chlorine was promptly discharged by the nozzle 12 and did not leak out to the atmosphere.

Comparative Example

In the comparative example, the respective parts of the flange fixing structure shown in FIG. 5 were configured with the materials shown in Table 4. Otherwise, the same conditions as those of the first example were applied. In the comparative example, $L_0\alpha_0$ is $5.2\times10^{-4}$ and $\Sigma t_i\alpha_i$ is $2.5\times10^{-4}$. In other words, in the comparative example, $L_0\alpha_0$ and $\Sigma t_i\alpha_i$ are substantially unequal.

In such comparative example, similarly to the first example, a chlorine gas leakage amount was evaluated by measuring the chlorine concentration in the nitrogen gas discharged from the nozzle 12. As a result, the chlorine gas concentration was equal to or less than the lower detection limit (i.e. 0.01 ppm) at room temperature; however, it reached the maximum of 150 ppm at 400° C. and thus, the chlorine gas leakage amount was at a maximum of 1.5 mL/min.

In addition, at this time, the temperature variation $\Delta T$ was 375 K, and the calculated value $\Delta T(L_0\alpha_0-\Sigma t_i\alpha_i)$ of the difference between the amount of elongation in the axial direction of the flange fixing bolt 3 and the amount of thickness increase of the fixed members was approximately 0.1 mm. On the other hand, the compression amount $\Delta t$ of the gasket 7 at the time of clamping was 0.2 mm and the recovery was 10% and thus, it was calculated to be $r(t-\Delta t)$ =0.06, and thus $\Delta T(L_0\alpha_0-\Sigma t_i\alpha_i)<r(t-\Delta t)$ failed to be satisfied.

TABLE 4

| Flange fixture $L_0\alpha_0$ = 5.2E−04 | | | |
|---|---|---|---|
| Member | Material | Linear expansion coefficient $\alpha_0$ [K$^{-1}$] | Length $L_0$ [mm] |
| Flange fixing bolt | SUS304 | 1.8E−05 | 29.1 |

| Fixed members $\Sigma t_i\alpha_i$ = 2.5E−04 | | | | |
|---|---|---|---|---|
| Number i | Member | Material | Linear expansion coefficient $\alpha_i$ [K$^{-1}$] | Thickness $t_i$ [mm] |
| 1 | Washer | SUS430 | 1.1E−05 | 1.5 |
| 2 | Flange pressing member A | SUS430 | 1.1E−05 | 6 |
| 3 | Buffer | Expansion graphite | 1.0E−04 | 0.4 |
| 4 | Flange | Quartz glass | 5.0E−07 | 10 |
| 5 | Gasket | Expansion graphite | 1.0E−04 | 0.8 |
| 6 | Flange | Quartz glass | 5.0E−07 | 10 |
| 7 | Buffer | Expansion graphite | 1.0E−04 | 0.4 |

As described above, in the flange fixing structure according to the present invention, even at the connection parts of the flange parts 2a and 2b where the temperature variation is significant, a condition where the leakage of fluid or the like is suppressed can be maintained for a long period of time.

It should be noted that, although the present embodiments are described in the above, the present invention is not limited thereto. For example, embodiments in which a person skilled in the art performs, as appropriate, addition, omission or design variation of components to the above-described respective embodiments or embodiments in which features of the respective embodiments are combined as appropriate, also fall under the scope of the present invention, provided that they have the gist of the present invention.

What is claimed is:

1. A flange fixing structure comprising:
   a fixture;
   a gasket; and
   flange parts that are fixed by means of the fixture in a butting manner via the gasket,
   wherein an effective length of the fixture is denoted by $L_0$, a linear expansion coefficient of the fixture is denoted by $\alpha_0$, thicknesses of n (where n is an integer of 1 or more) members held by the fixture are respectively denoted by $t_1$ to $t_n$, and linear expansion coefficients of the n members are respectively denoted by $\alpha_1$ to $\alpha_n$,
   a product $L_0\alpha_0$ of the effective length $L_0$ of the fixture and the linear expansion coefficient $\alpha_0$ of the fixture is made substantially equal to a sum $\pi t_i\alpha_i$ (i=1 to n) of products of the respective thicknesses $t_1$ to $t_n$ and the respective linear expansion coefficients $\alpha_1$ to $\alpha_n$.

2. The flange fixing structure according to claim 1, wherein, a thickness of the gasket sandwiched between the flange parts is denoted by t, an amount of variation in thickness between prior to and after fixing by sandwiching the gasket is denoted by $\Delta t$, and recovery of the gasket is denoted by r,
   $\Delta T(L_0\alpha_0-\pi t_i\alpha_i)<r(t-\Delta t)$ is satisfied when a temperature is varied by $\Delta T$ after the flange parts are fixed by means of the fixture.

3. The flange fixing structure according to claim 1, wherein, a thickness of the gasket sandwiched between the flange parts is denoted by t, an amount of variation in thickness between prior to and after fixing by sandwiching the gasket is denoted by $\Delta t$, and recovery of the gasket is denoted by r,
   $\Delta T(L_0\alpha_0-\pi t_i\alpha_i)<0.1r(t-\Delta t)$ is satisfied when a temperature is varied by $\Delta T$ after the flange parts are fixed by means of the fixture.

4. The flange fixing structure according to claim 1, wherein a buffering member is arranged between one flange part of the flange parts and the fixture.

5. The flange fixing structure according to claim 4, wherein, when the flange parts are fixed by means of the fixture, an amount of compression of the buffering member is smaller than an amount of compression of the gasket.

6. The flange fixing structure according to claim 4, wherein a material of the buffering member is a ceramic fiber sheet.

7. The flange fixing structure according to claim 4, wherein a material of the buffering member is an expansion graphite sheet.

8. The flange fixing structure according to claim 7, wherein a structure is provided that keeps surroundings of the buffering member in an inert gas atmosphere.

9. The flange fixing structure according to claim 1, wherein the gasket is made of an expansion graphite sheet.

10. The flange fixing structure according to claim 9, wherein a structure is provided that keeps a periphery of the gasket in an inert gas atmosphere.

* * * * *

UNITED STATES PATENT AND TRADEMARK OFFICE
CERTIFICATE OF CORRECTION

PATENT NO. : 9,683,689 B2  
APPLICATION NO. : 14/711134  
DATED : June 20, 2017  
INVENTOR(S) : Tetsuya Otosaka Page 1 of 1

It is certified that error appears in the above-identified patent and that said Letters Patent is hereby corrected as shown below:

Column 10, Claim number 1, Line 31 should read:
substantially equal to a sum $\Sigma t_i \alpha_i$ (i = 1 to n) of products

Column 10, Claim number 2, Line 40 should read:
$\Delta T(L_0 \alpha_0 - \Sigma t_i \alpha_i) < r(t - \Delta t)$ is satisfied when a temperature is

Column 10, Claim number 3, Line 49 should read:
$\Delta T(L_0 \alpha_0 - \Sigma t_i \alpha_i) < 0.1 \, r(t - \Delta t)$ is satisfied when a tempera-

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*